Nov. 17, 1925.

I. KODAMA 1,561,730

DRINKING GLASS

Filed March 24, 1924

Witnesses
Evelyn Crompton
George A. Gruss

Inventor
Isami Kodama

By Joshua R. H. Potts
Attorney

Patented Nov. 17, 1925.

1,561,730

UNITED STATES PATENT OFFICE.

ISAMI KODAMA, OF MEADOW BROOK, PENNSYLVANIA.

DRINKING GLASS.

Application filed March 24, 1924. Serial No. 701,326.

*To all whom it may concern:*

Be it known that I, ISAMI KODAMA, a subject of the Emperor of Japan, residing at Meadow Brook, in the county of Montgomery and State of Pennsylvania, have invented certain new and useful Improvements in Drinking Glasses, of which the following is a specification.

My invention relates to drinking glasses and its object is to provide a glass with a picture, printed matter, or other perceptible object, which to one looking into the empty glass will be invisible or, if visible at all, will appear in such distorted form as to be unrecognizable, but which when the glass is filled, or partly filled with liquid will appear clearly with its natural configuration.

This object, and other advantageous ends which will be described hereinafter, I attain in the following manner, reference being had to the accompanying drawing in which—

Figure 1:
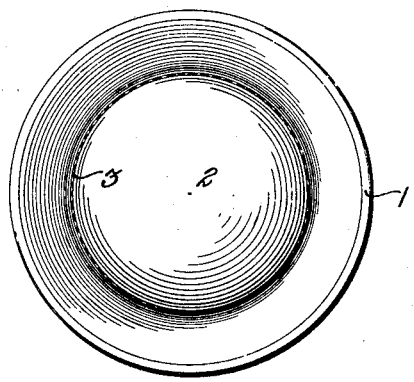

Figure 1 is a plan view of a drinking glass constructed in accordance with my invention.

Figure 2:
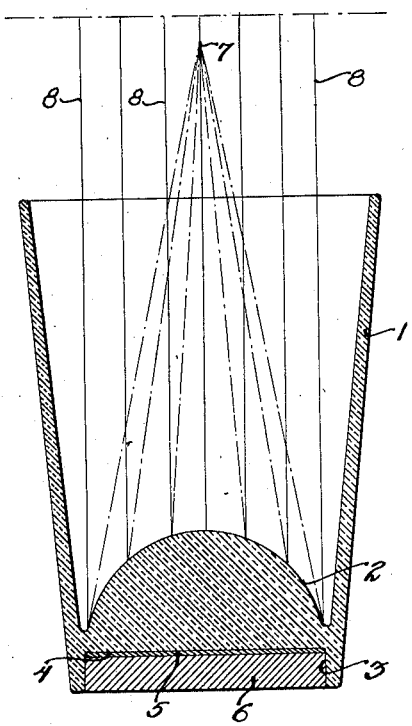

Figure 2 a central section through the glass shown in Figure 1, and

Figure 3:
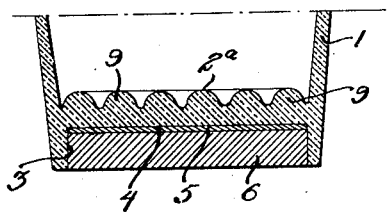

Figure 3 a fragmentary view similar to Figure 2 showing a modified form.

Referring to the drawing, 1 indicates a drinking glass, shown as of tumbler form, having its bottom provided with a substantially curved inner face 2, preferably convex, and a recess 3 in its outer or under face. The recess is preferably formed to provide a flat face 4 on the bottom of the tumbler. An object 5, such as a picture, written or printed matter, coin or the like, is placed within recess 3 and may be secured therein by cement as indicated at 6. In order to secure the desired result, the curvature of the face 2 must be substantial and should approximate a semi-spherical or semi-cylindrical arc.

If one looks into the empty glass the convex inner face will focus the picture, or other object, to a point above the tumbler, indicated at 7, and the object, if visible at all, will appear in such vague or distorted form as to be unrecognizable. If the glass is filled with liquid, or filled to a point above the convex face in its bottom, the picture or other object will appear clearly and in its natural outline as if seen upon the parallel lines 8 owing to the different refractive index of the liquid.

In Figure 3, I have shown the inner bottom face 2ª undulated preferably by a series of corrugations 9 with curved faces. In all other respects the bottom of the tumbler is like that shown in Figure 2. A tumbler, having a bottom of this type, produces no central focus point but renders the object practically invisible or distorts it beyond recognition when one looks into the empty glass, but when the glass is filled with water the object will be seen clearly owing to the lines of refraction of the water.

The tumbler above described may be used for advertising purposes or as a souvenir.

I am aware that the prior art discloses drinking glasses having coins or like objects secured in their bottoms and showing the inner bottom faces slightly concave or convex. The object sought was perfect visibility and any substantial curvature would defeat this object. I am not aware of any prior disclosure in which the curvature was more than incidental or sufficient to produce the result which is the object of my invention.

While I have described my invention as taking a particular form, it will be understood that the various parts may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. A drinking glass having a perceptible object secured to its flat outer bottom face and having its inner bottom face substantially curved whereby the object is invisible or unrecognizable to one looking into the empty glass but clearly visible to one looking into the glass when filled or partly filled with a transparent liquid.

2. A drinking glass having a flat bottom face and having its inner bottom face substantially curved, and a perceptible object secured in the flat bottom face whereby the object is invisible or unrecognizable to one looking into the empty glass but clearly visible to one looking into the glass when filled or partly filled with a transparent liquid.

3. A drinking glass having a perceptible object secured to its flat outer bottom face and having its inner bottom face thickened substantially in convex form whereby the object is invisible or unrecognizable to one looking into the empty glass but clearly visible to one looking into the glass when filled or partly filled with a transparent liquid having a refractive index different from that of the convex form.

4. A drinking glass having its inner bottom face substantially convex, a recess having a flat surface in its outer bottom face, and a perceptible object secured on the flat surface of the recess whereby the object is invisible or unrecognizable to one looking into the empty glass but clearly visible to one looking into the glass when filled or partly filled with a transparent liquid.

5. A glass drinking vessel or the like having a plano-convex bottom, a picture secured to the under face of the bottom, the degree of convexity being such as to provide a lens of sufficient strength to shorten the focal length and obscure the picture, while water placed within the vessel will reduce the strength of the lens and bring the picture into focus.

In testimony whereof I have signed my name to this specification.

ISAMI KODAMA.